United States Patent [19]
Melen

[11] Patent Number: 6,097,844
[45] Date of Patent: Aug. 1, 2000

[54] STEREOGRAPHIC IMAGE COMPRESSION WITH ADAPTIVE CONTROL PARAMETER GENERATION

[75] Inventor: Roger D. Melen, Los Altos Hills, Calif.

[73] Assignee: Canon Kabushiki Kaisha, Tokyo, Japan

[21] Appl. No.: 09/112,667

[22] Filed: Jul. 9, 1998

[51] Int. Cl.[7] ...................................................... G06K 9/36
[52] U.S. Cl. ............................................................. 382/232
[58] Field of Search .................................. 382/100, 154, 382/232; 345/419, 433, 473

[56] References Cited

U.S. PATENT DOCUMENTS 5,748,199   5/1998   Palm ....................................... 345/473

Primary Examiner—Jose L. Couso
Attorney, Agent, or Firm—Fenwick & West LLP

[57] ABSTRACT

A stereographic image compressor (100) includes an Image Size and Position Unit (ISPU) (101) that resizes and repositions a pair of images which are indicative, respectively, of first and second fields of view (111,114) of an image (104) and which are generated by a pair of image sensor arrays (106,108). The ISPU (101) causes both images to have a same size and position. The ISPU (101) generates a first modified image signal (103) and a second modified image signal (105) indicative of such resized and repositioned images. A function processing unit (118) generates a difference signal (120) indicative of differences between the first modified image signal (103) and the second modified image signal (105). The difference signal (120) is compressed by a lossy compressor (122) for storage on a storage device (102). The first modified image signal (103) is also compressed by a lossy compressor (124) for storage on the storage device (102). The image signals (110 and 112) are time synchronized by an image data synchronizer (116). The function processing unit (118) generates difference signal (120) by way of one of a plurality of mathematical operations. An adaptive processing unit (130) adaptively generates, during a calibration mode, size and position information (132,134) for use by the ISPU (100) and also generates weighting parameters (136) for use by the function processing unit (118).

8 Claims, 7 Drawing Sheets

STEREOGRAPHIC IMAGE COMPRESSION WITH ADAPTIVE CONTROL PARAMETER GENERATION

RELATED APPLICATIONS

This application is related to the following U.S. patent applications which are filed concurrently herewith and which are assigned to the assignee of the present application: STEREOGRAPHIC IMAGE COMPRESSION WITH IMAGE DIFFERENCE GENERATION AND LOSSY COMPRESSION U.S. application Ser. No. 09/113,813 filed Jul 9, 1998; and STEREOGRAPHIC IMAGE COMPRESSION WITH IMAGE MOMENT NORMALIZATION U.S. application Ser. No. 09/113,937 filed Jul. 9, 1998.

TECHNICAL FIELD

This invention relates generally to the field of image compression and more particularly to the field of compression of stereographic images.

BACKGROUND ART

Stereographic images are typically generated with two electronic image sensing arrays. These arrays are positioned at a distance from each other to create a pair of images having different fields of view of the same scene. The resulting pair of images can then be used to create a composite image containing depth information. Such depth information provides increased realism by providing a three-dimensional (3D) type view. A significant drawback to such images is the increased data generated by such images and the associated increased storage requirements for such data. The data generated by the dual arrays is twice the amount of data generated for an image having only a single field of view. High resolution images, which contain more data, amplify this problem. U.S. patent application entitled "STEREOGRAPHIC IMAGE COMPRESSION WITH IMAGE DIFFERENCE GENERATION AND LOSSY COMPRESSION," (ATTY. DOCKET #3090(CFP0666US)) referenced above discloses novel techniques for compressing stereographic images.

A further problem with stereographic images are small differences in size and position between the images generated by the pair of image sensing arrays. Such differences result in increased distortion and reduced compressibility. U.S. patent application entitled "STEREOGRAPHIC IMAGE COMPRESSION WITH IMAGE MOMENT NORMALIZATION," (ATTY. DOCKET #3093 (CFP0667US)) discloses novel techniques for resizing and repositioning stereographic images to improve stereographic image quality and improve stereographic image compressibility.

Certain techniques disclosed in the foregoing two patent applications require, or benefit from, use of predetermined constants that weight or scale certain parameters. The exact value of such constants can vary between applications due to storage requirements and/or image quality considerations and due to device variations. It is therefore desirable for at least certain of such parameters to be changeable to match the particular requirements of a device or application.

BRIEF SUMMARY OF THE INVENTION

The present invention advantageously generates size, position and weighting parameters for use in resizing, repositioning and compressing two fields of view that comprise a stereographic image. In a principal aspect, a stereographic image compressor (100) comprises an image size and position unit (101) which is responsive to a first image signal (110) and a second image signal (112). The first image signal (110) contains image information of a scene (104) from a first field of view (111) and the second image signal (112) contains image information of the scene from a second field of view (114). The image size and position unit (101) resizes and repositions images represented by the first and second image signals (110,112) to generate a modified first image signal (103) and a modified second image signal (105). The modified first signal (103) and the modified second signal (105) each represent an image characterized by a same size and position. The function processing unit (118) generates a difference image signal (120) that is indicative of differences between the modified first image signal (103) and the modified second image signal (105). A lossy compressor (126) compresses information contained in the difference image signal (120) to generate a compressed image information signal (126). An adaptive processing unit (130) operates in a calibration mode to generate size and position values for use by the image size and position unit (101) and weighting values for use by the function processing unit (118).

Adaptive generation of the size, position and weighting values advantageously minimizes the amount of storage required to store information for reproduction of the stereographic image. Such adaptive generation also accounts for variations between devices in manufacture and from aging and repositioning of the image sensing arrays during normal use.

These and other features and advantages of the present invention may be better understood by reference to the attached specification and drawings.

DETAILED DESCRIPTION OF THE PREFERRED EMBODIMENTS

Figure 1:
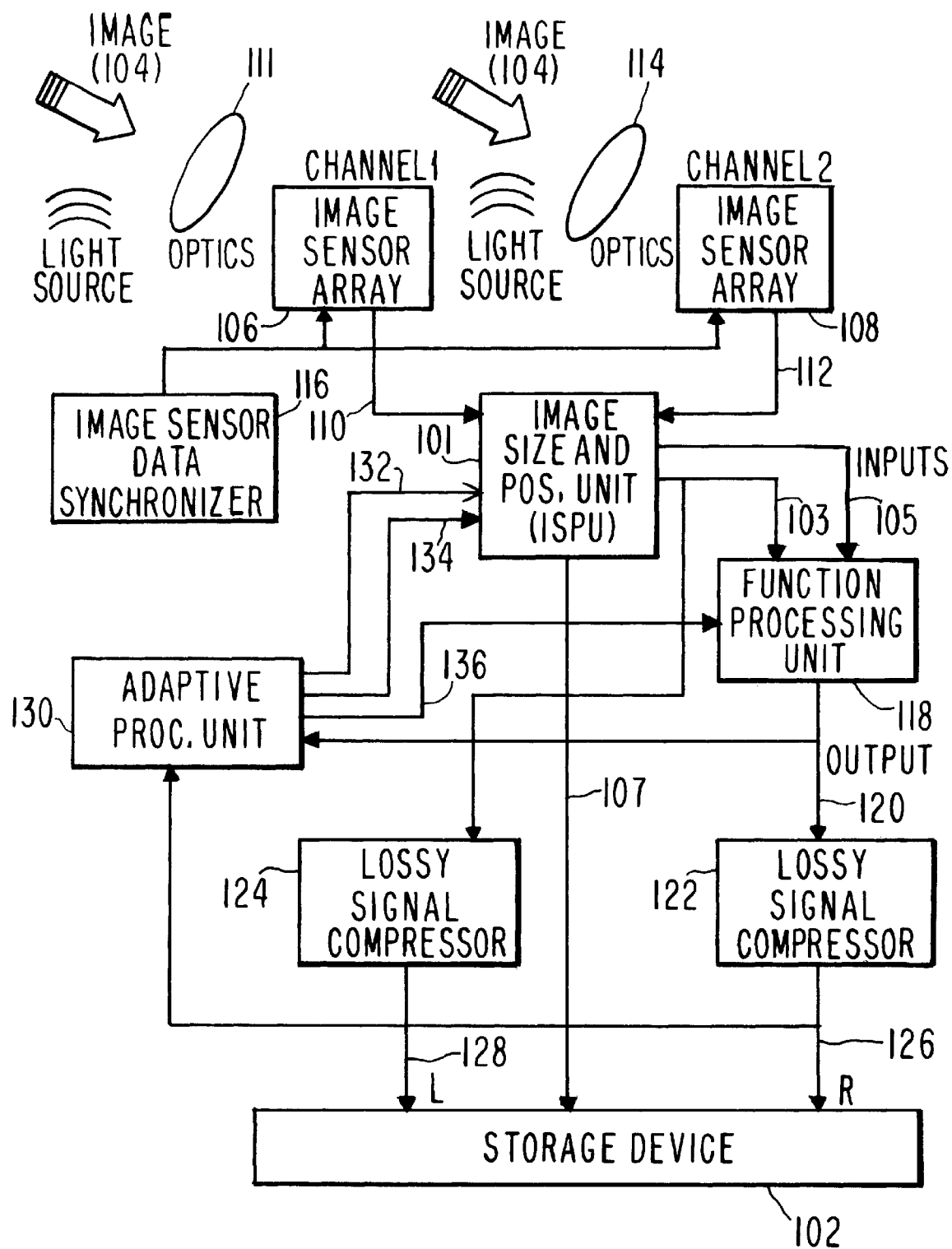
FIG. 1 is a block diagram of a stereographic image compression system employing the principles of the present invention.

In FIG. 1, a stereographic image compression system 100 operates to generate compressed image data, 126 and 128, indicative of stereographic images for storage in storage device 102. The image information stored in storage device 102 preferably comprises two channels of information. The two channels of information are generated by image sensor arrays 106 and 108. Image sensor array 106 generates an image signal 110 indicative of a first field of view 111 of image 104. Image sensor array 108 generates an image signal 112 indicative of a second field of view 114 of image 104. Image sensor arrays 106 and 108 are positioned at a predetermined distance from one another and at predetermined angles relative to one another to generate fields of view 111 and 114. Preferably image sensor arrays 106 and 108 are each conventional and employ charge coupled device technology or other conventional image sensing mechanisms that provide an electronic signal indicative of image 104. It is preferable that sensor arrays 106 and 108 are closely matched to minimize differences in signals 110 and 112 introduced by device variations in sensors 106 and 108. Image signals 110 and 112 are time varying signals which are preferably synchronized by way of image data synchronizer 116 to cause signals 110 and 112 to provide time synchronized images of fields of view 111 and 114 and allow the data contained in such signals to be operated on an individual array picture element (pixel) basis. Image data synchronizer 116 operates generally to cause signals 110 and 112 to be time synchronized. This may be accomplished in a number of ways including controlling arrays 106 and 108 to generate signals 110 and 112 synchronously. Alternatively, the image data synchronizer may receive signals 110 and 112, and compare time stamps which may be contained in such signals and control the transmission of signals 110 and 112 to the other destinations such as blocks 118 and 124.

Image signals 110 and 112 are received by Image Size and Position Unit (ISPU) 101 which modifies size and/or position of images represented by signals 110 and 112 to generate signals 103 and 105 that represent fields of view 111 and 114 respectively and are of like size and position. Connected image signals 103 and 105 are received by function processing unit 118 which generates a difference signal 120 indicative of differences between signals 103 and 105. Difference signal 120 is compressed by a lossy signal compressor 122 to generate signal 126 which is stored on storage device 102. A second lossy signal compressor 124 compresses connected image signal 103 also for storage and storage device 102. Lossy signal compressors 122 and 124 are preferably conventional and may employ one of a variety of known compression techniques including JPEG, motion JPEG, or MPEG compression algorithms. The compressed difference signal 126 generated by lossy signal compressor 122 and the compressed signal 128 generated by lossy signal compressor 124 advantageously comprise all of the information required to generate a stereographic type image of image 104.

Adaptive processing unit 130 operates in accordance with the principles of the present invention to generate weighting parameters (K1, K2, K3), shown as signal 136, for use by function processing unit 118, and to generate size parameters (x, y), shown as signal 134, and position parameters (Δx, Δy), shown as signal 132, for use by ISPU 101.

The system shown in FIG. 1 is shown for purposes of explanation only and should not be construed to be limiting in any way. For example, the system of FIG. 1 may be modified so that the signal 112 is compressed by lossy signal compressor 124 instead of signal 110. Modules 101, 116, 118, 122, 124 and 130 can be implemented in hardware, software and/or firmware.

Figure 2:
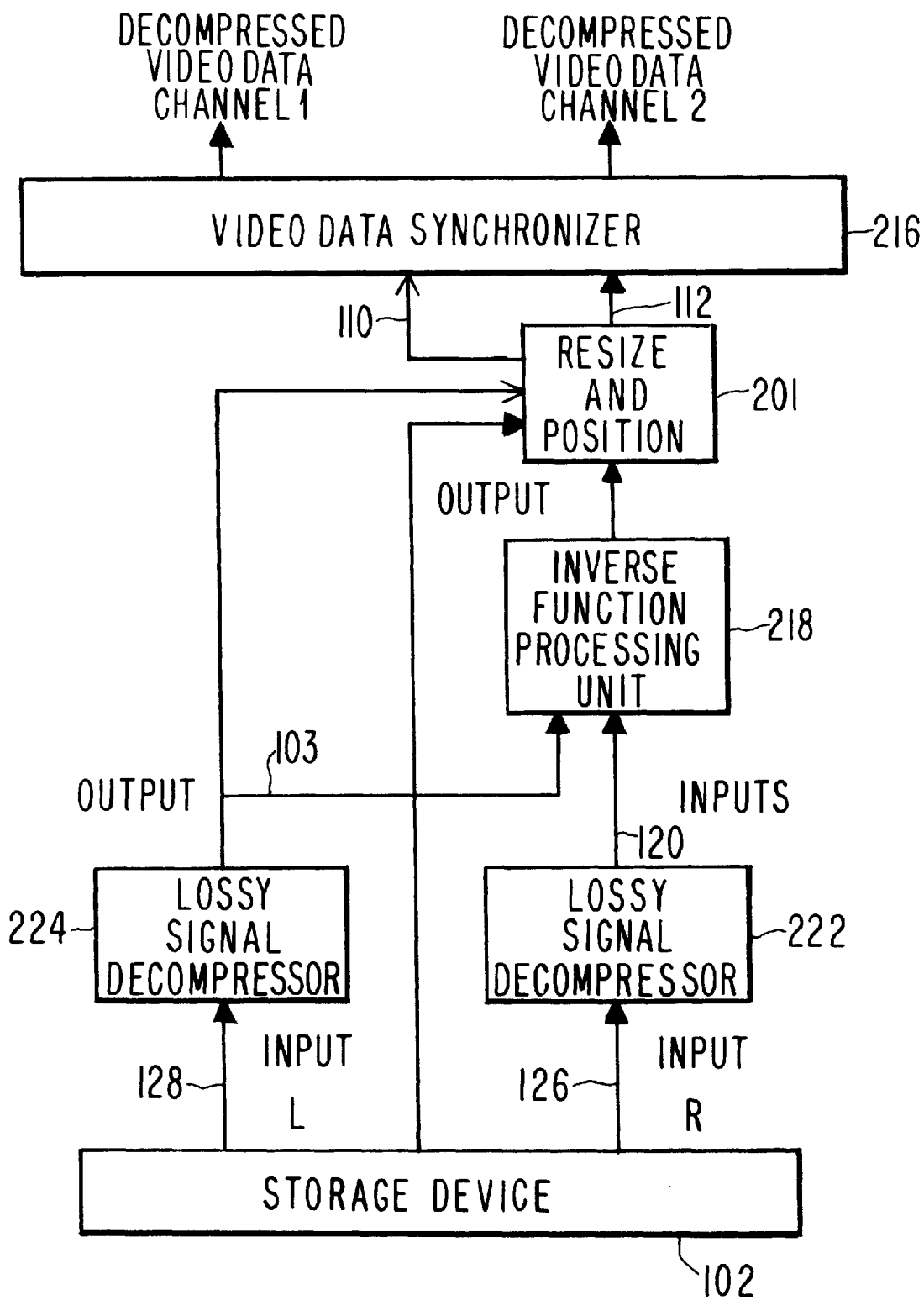
FIG. 2 is a block diagram illustrating generation of a stereographic image from data generated by the system of FIG. 1.

The image stored on storage device 102 may be recreated in a manner shown in FIG. 2. The functions shown in blocks 222, 224, 218, 201 and 216 essentially perform the inverse function of the corresponding functions shown in FIG. 1 to generate two (2) channels 110 and 112 of data. Lossy signal compressors 224 and 222 receive data signals 128 and 126 respectively and decompress the received signals to generate signals 103 and 120. Inverse function processing unit 218 receives signals 103 and 120 and generates data signal 105.

ISPU 201 receives signal 105 and generates image signals 110 and 112. Videodata synchronizer 216 receives signals 110 and 112, synchronizes the two signals to generate two channels of data (channel 1 and channel 2) which can be used in a conventional manner to generate a stereographic image.

Figure 3:
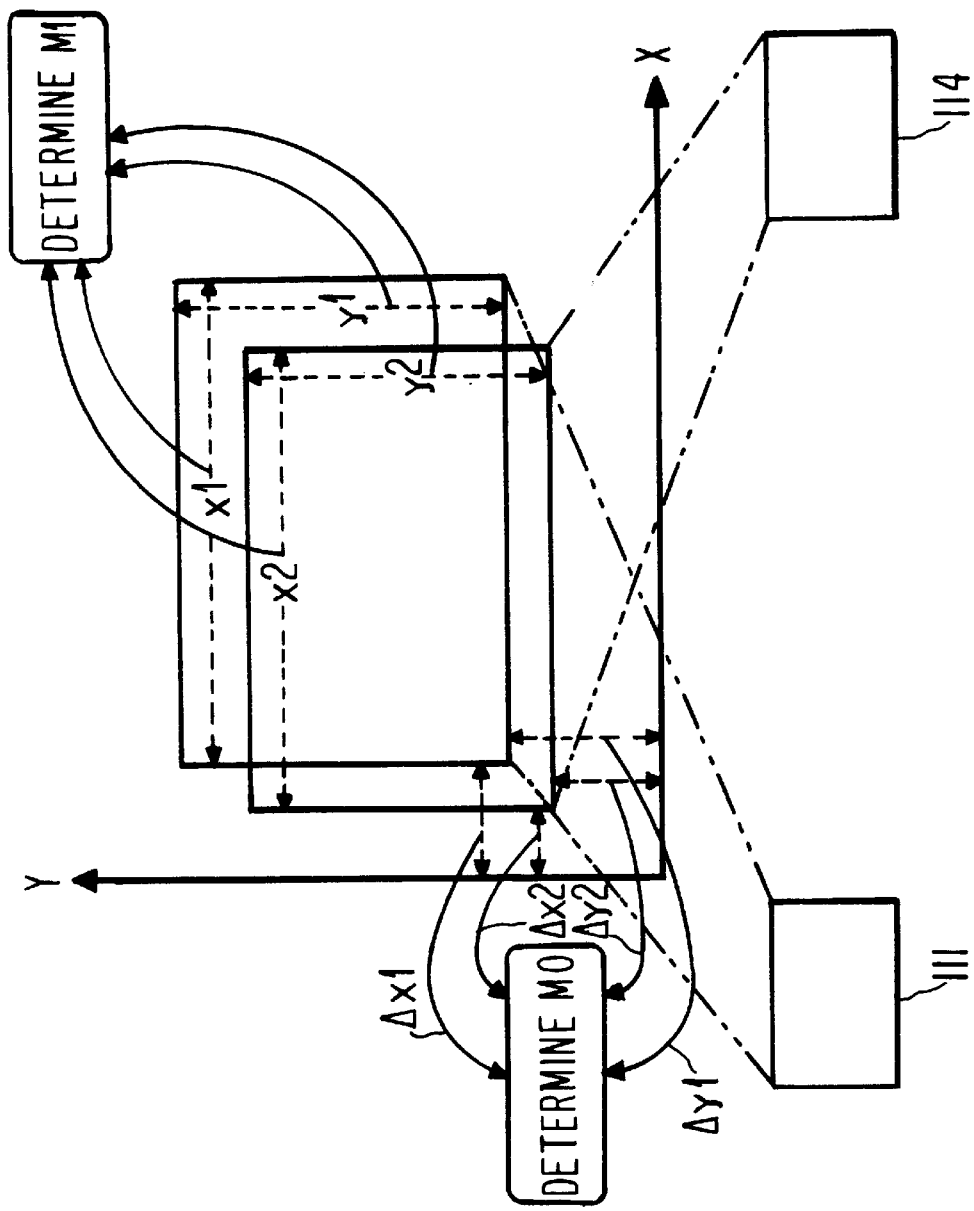
FIG. 3 is a block diagram illustrating operation of the image size and position unit of FIG. 2.

FIG. 3 illustrates operation of ISPU 218. FIG. 3 shows the relative size and position, by way of example in a two-dimensional space characterized by a horizontal (x) axis and a vertical (y) axis, of first field of view 111 and second field of view 114. As shown, fields of view 111 and 114 have different sizes and positions. Field of view 111 is characterized by a first size (x1 by y1) and a first position (Δx1 and Δy1). Field of view 114 is characterized by a second size (x2 by y2) and a second position (Δx2 and Δy2). The difference in size and position between the two fields of view 111 and 114 can occur for a variety of reasons. Small variations in the relative angle between sensor array 106 and 108 and image 104 results in each sensor array 106 and 108 capturing an image having a field of view that represents a different portion of image 104. Variations in the sensors 106 and 108, caused by normal manufacturing processes, or gradual degradation of the sensor, result in each sensor array 106 and 108 capturing an image of slightly different size.

ISPU 101 employs a horizontal and vertical axis, such as shown in FIG. 3 to determine the relative size and position of fields of view 111 and 114. The axes simply provide a reference point and the exact positioning of the axes is therefore not important. ISPU 101 determines a first moment value (M0) indicative of a difference in relative position between fields of view 111 and 114 as a function of values (Δx1, Δy1) and (Δx2, Δy2). ISPU 101 also determines a second moment value (M1) indicative of a difference in size between fields of view 111 and 114 as a function of (x1, y1) and (x2, y2). The moment values M0 and M1 are used by ISPU 101 to resize and/or reposition one or both fields of view 111 and 114. In essence, the ISPU 101 normalizes the moments, represented by moment values M0 and M1, of fields of view 111 and 114.

Determination of which of the images are resized and/or repositioned may be accomplished in a variety of ways. In accordance with the principles of the present invention, resizing and repositioning parameters are generated by adaptive processing unit 130. These parameters may then be overridden by user selected preferences. User selection may be based on different criteria, such as image compressibility. Fields of view that have the same size and position have background images that are aligned and thus are characterized by greater compressibility. User decisions as to resizing and positioning may also be based on image quality considerations. For example, perspective in images is ideally achieved by making background images at infinity from both fields of view to be identical.

Figure 4A:
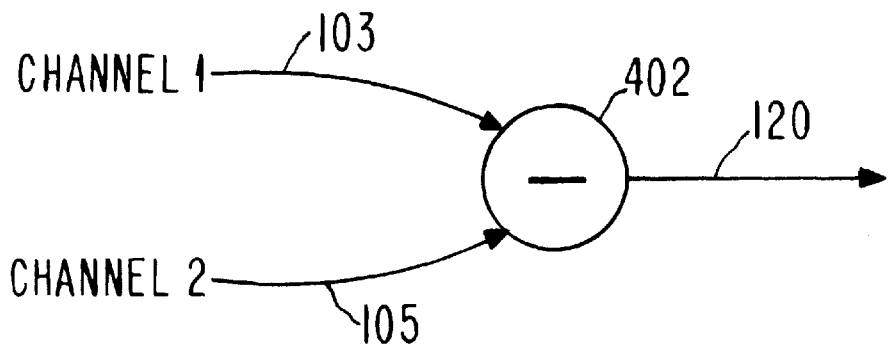
FIGS. 4(a–d) are block diagrams showing alternative embodiments of the function processing unit of FIG. 1.
Figure 4B:
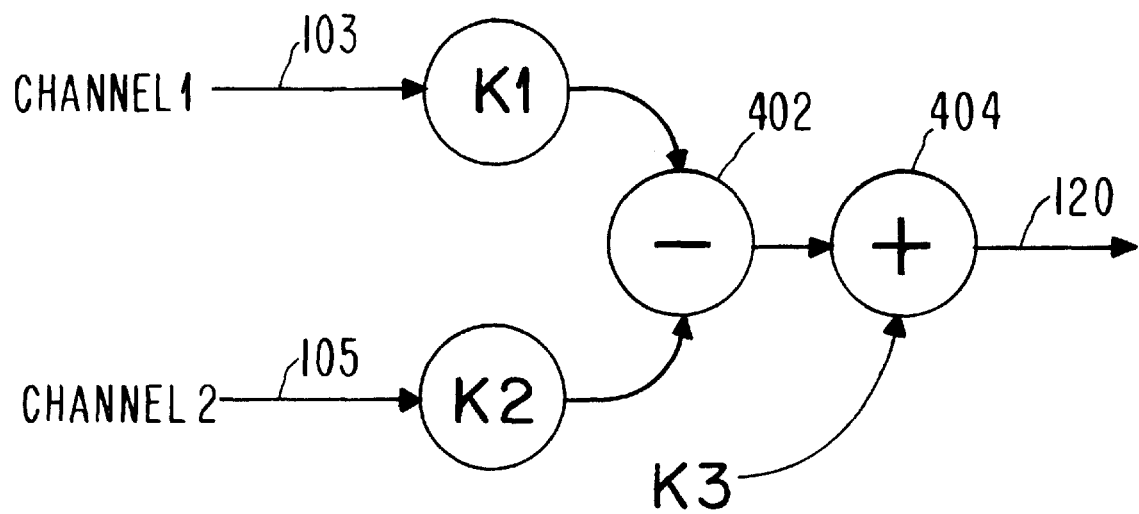
Figure 4C:
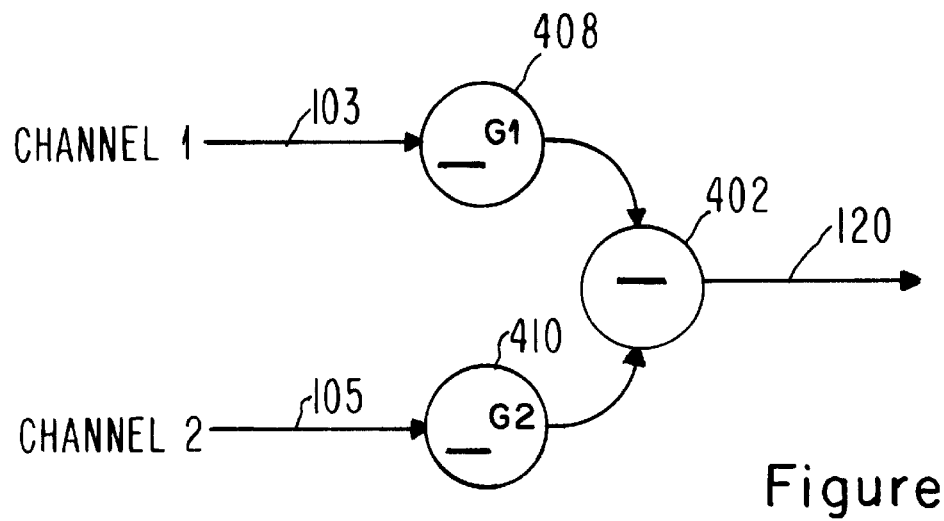
Figure 4D:
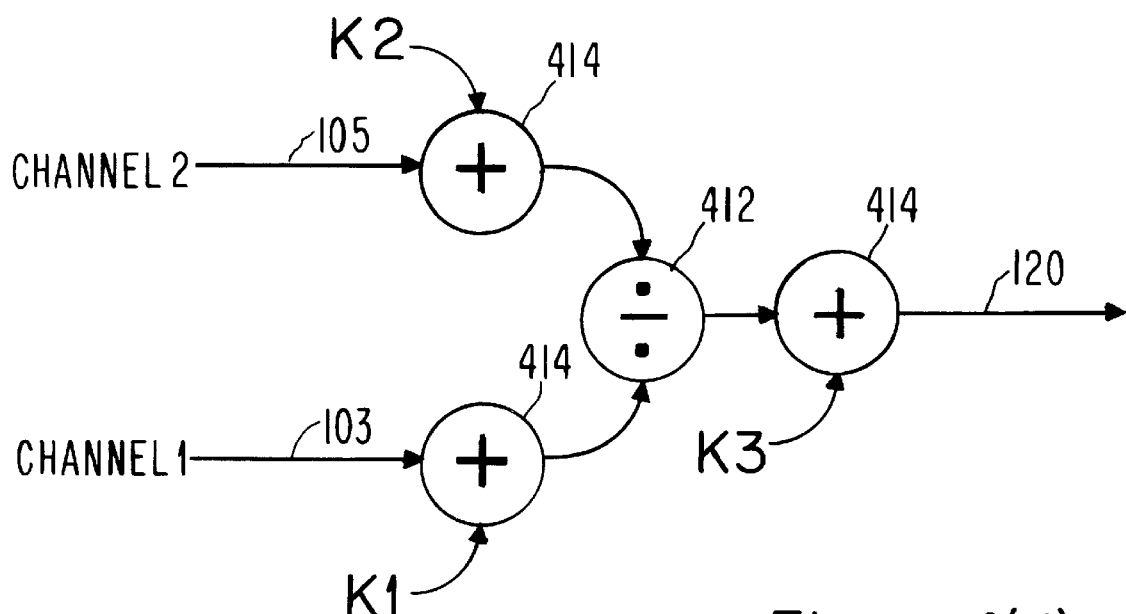

Function processing unit 118 is now described in further detail. Function processing unit 118 preferably takes one of a variety of forms to realize one of a plurality of desired mathematical functions to generate difference signal 120. Four example embodiments of the mathematical functions realized by function processing unit 118 are shown in FIGS. 4(a), 4(b), 4(c) and 4(d). In FIG. 4(a), function processing unit 118, generates signal 120 by way of a subtraction function 402 that generates a difference between corresponding components of signals 110 and 112. In FIG. 4(b) function processing unit 118 scales signals 110 and 112 by respective constants K1 and K2. The difference between corresponding components of the scaled signals is then generated by subtraction function 402. This difference is further modified by addition of an offset represented by constant K3 to generate signal 120. In FIG. 4(*c*), function processing unit 118 signals 110 and 112 are gamma corrected by exponential values G1 and G2. Gamma correction may be used to correct for a variety of physical phenomena such as matching dynamic range of sensors 106 and 108. For example, if the sensors 106 and 108 provide data, such as twelve-bits per pixel, which exceeds the capacity of the storage device 102 (which may ideally have a capability of eight-bits per pixel) then gamma correction may be used to narrow the dynamic range of the signals 110 and 112 to match the storage capacity of the storage device 102. As a further example, gamma correction may be used to correct for sensor non-linearity. The resulting signals are then fed to subtraction function 402 which generates difference signal 120. In FIG. 3(*d*), signals 110 and 112 are first scaled by addition of constants K1 and K2 respectively. The resulting signals are then divided by module 412. The resulting value is then modified by way of addition of constant K3 to generate signal 120.

The embodiments shown in FIGS. 3, 4(*a*), 4(*b*), 4(*c*) and 4(*d*), may operate on either digital or analog representations of signals 110 and 112. The constants such as K1, K2 K3, G1 and G2 that are used for scaling, offsetting or gamma-correcting are preferably either predetermined or selectable to generate difference signal 120 in a manner that provides an acceptable image quality but meets the storage requirements of a particular application. Preferably, the mathematical function shown in FIGS. 4(*a*), 4(*b*), 4(*c*) and 4(*d*) or other acceptable mathematical function, may be selectable by a user. The user can thus judge which function is appropriate based on prior experience. Alternatively, the functions shown in FIGS. 4(*a*) to 4(*d*) may be chosen based on a display providing indication of the amount of output data bandwidth required to represent the difference signal 126.

Figure 5:
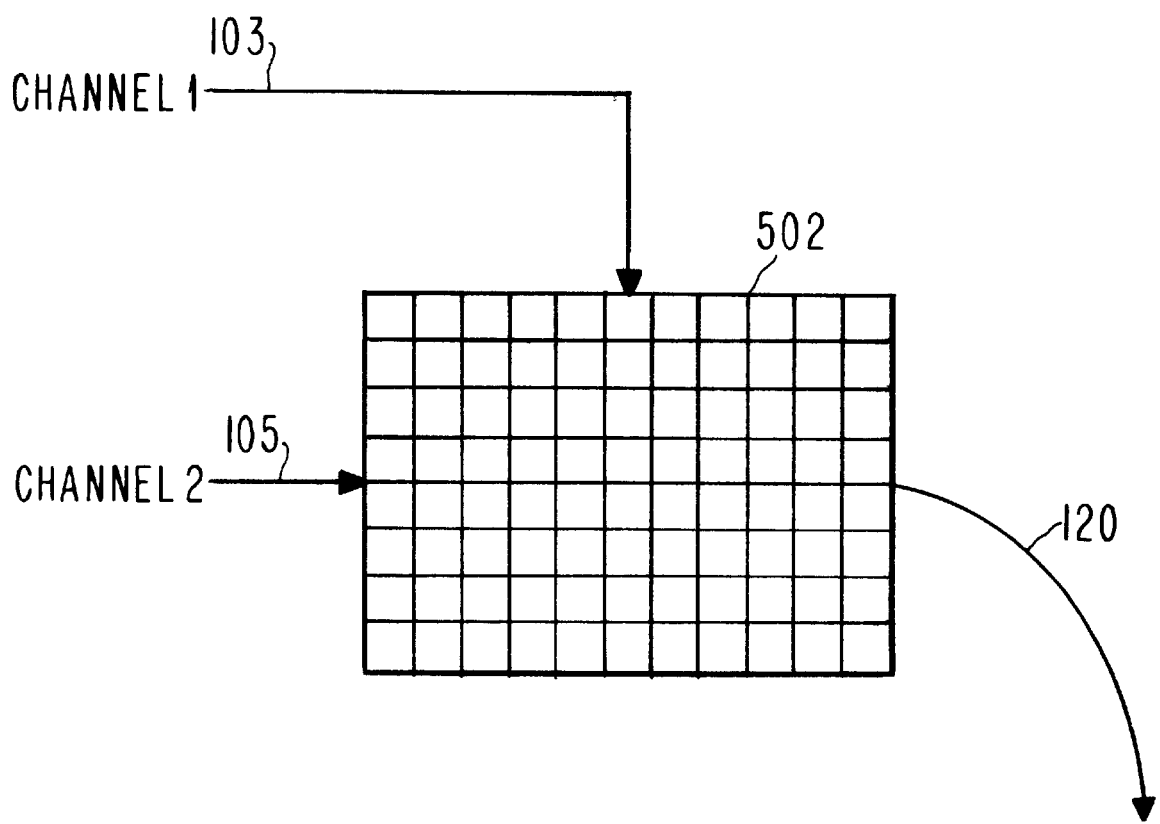
FIG. 5 is a block diagram showing further details of a specific embodiment of the function processing unit of FIG. 1.

FIG. 5 shows an embodiment of function processing unit 118 which operates on digital representations of signals 103 and 105. In FIG. 5, a look-up table 502 is used to store values indicative of predetermined relationships between signals 103 and 105. The lookup table 502 may advantageously be implemented by conventional random-access type of memories. Signals 103 and 105 are used as addresses to access table 512 to generate stored data values 120. The embodiment shown in FIG. 5 advantageously provides rapid generation of signal 120 in response to signals 103 and 105. In the embodiment shown in FIG. 5, the data synchronizer 116, ISPU 101 and lossy signal compressors 122 and 124 may also be implemented by digital mechanisms, including programmed digital computers. In alternative embodiments, function processing unit 118 may be realized by analog circuit components to perform the addition, subtraction, multiplication and division functions shown in FIGS. 4(*a*), 4(*b*), 4(*c*) and 4(*d*). For such analog embodiments data synchronizer 116, ISPU 101, and signal compressors 122 and 124 may be implemented with either analog or digital mechanisms (including hardware and software) to meet the cost, performance, packaging and other requirements of a particular application.

The goal of the output data 120 of the function processing unit 118 is to represent an approximation to the incoherence between the element data of the two sensor arrays 106 and 108. This transensor incoherence advantageously compresses highly with traditional lossy compression techniques such as employed by compressors 124 and 122. This high compression factor is due to the large amount of spatial coherence present in many regions of the transensor incoherence data. For the extreme case of the image sensors 106 and 108 imaging only far away image objects, the two sensors may have identical synchronized output data. For this case, utilizing a simple difference processing function such as implemented in FIG. 4(*a*) results in all zero data from the output of function processing unit 118. This all zero data compresses highly with many lossy compression algorithms. Using this method on many photographic scenes using a spacing between sensors 106 and 108 of an amount approximately the inter-ocular spacing of the human eye, the amount of compression achieved may be much higher than for the case where lossy compression is directly applied to the output of the two sensors. For the case of directly applied compression the image data for two channels is approximately two times the data required for one image channel. While using the function processing techniques described herein, the two channels may require only 10–20% more data size than one channel alone.

The principles described herein may be used with a single frame of image data for still image photography, as well as with time sequential frames for video images as described above. For stationary image scenes a single sensor (106 or 108) may be used to generate depth information by recording the image 104 at two different points in time to capture fields of view 111 and 114. In this case, the image sensor output is stored from two different locations. The function processing unit 118, ISPU 101 and lossy compressors 122 and 124 simply operate on the stored data rather than the data directly from the image sensors.

Figure 6:
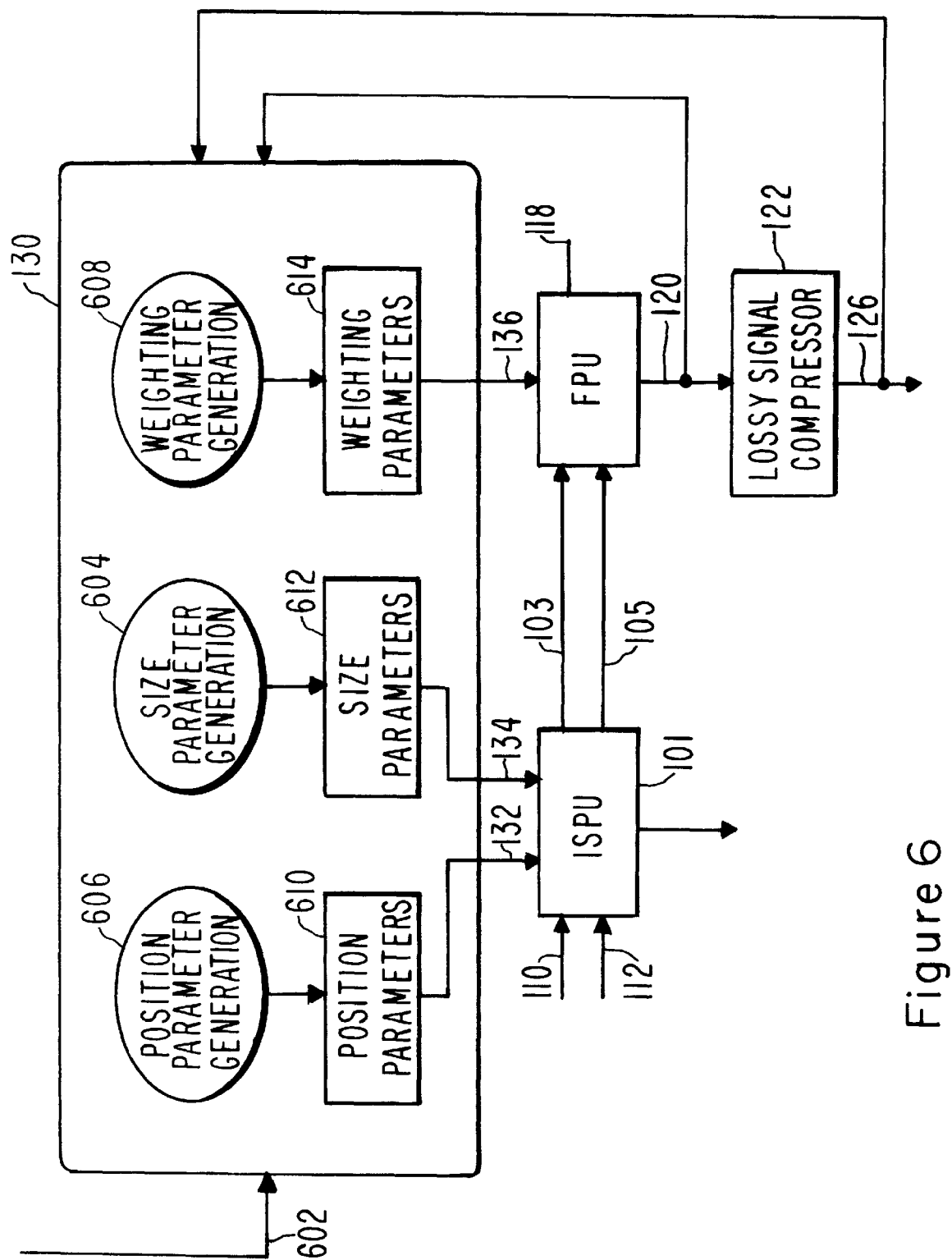
FIG. 6 is a block diagram showing further details of the adaptive processing unit of FIG. 1.

FIG. 6 of the drawings shows further details of the operation of adaptive processing unit 130. Adaptive processing unit 130 operates in response to a calibrate signal 602, which may be generated each time power is applied to the system 100 or also in response to a user activated input. Unit 130 responds to calibrate signal 602 by causing image sensing arrays 106 and 108 to generate signals 110 and 112. The units 101, 116, 118, 126 and 128 operate as described above to generate signals 126 and 128. The adaptive processing unit 130 captures signals 120 and 126, as generated by function processing unit 118 and compressor 122 respectively, and generates size 134 (x, y), position 132 (Δx, Δy), and weighting signals 136 (K1, K2 and K3) by way of size parameter generation module 604, position parameter generation module 606 and weighting parameter generation module 608. Position parameters (ΔX, ΔY) shown at 610 in FIG. 6 are provided to ISPU 101 to reposition images represented by signals 110 and 112. Size parameters (X, Y), shown at 612 in FIG. 6, are also provided to ISPU 101 to resize images represented by signals 110 and 112. Weighting parameters (K1, K2, K3), shown at 614 in FIG. 6, are provided to FPU 118 to generate difference signal 118 in accordance with one of the embodiments shown in FIGS. 4(*b*), 4(*c*) or 4(*d*). In the event that the embodiment shown in FIG. 4(*a*) is used exclusively, then unit 130 does not generate any weighting parameters. In the event that the embodiment shown in FIG. 4(*c*) is used, then the exponential values (G1, G2) are generated by unit 130.

Modules 604, 606, and 608 each receive the input and output of compressor 122 (signals 120 and 126). These signals advantageously provide the adaptive processing unit 130 with information indicative of the effectiveness of compressor 122 in compressing difference signal 120 to generate signal 126. Each of the modules 604, 606 and 608 respond to the signals 120 and 126 by modifying parameters 610, 612 and 619 to maximize compressibility of signal 120.

Once parameters 610, 612 and 614 have been determined, such parameters may preferably be modified to generate stereographic images that suit a particular user's aesthetics tests. For example, in an embodiment employing a relatively large storage device 102, a user may be able to cause parameters 610, 612, 619 to be modified to sacrifice compressibility for image quality. In embodiments with somewhat smaller storage requirements, image quality may have to be sacrificed somewhat.

It is to be understood that the specific mechanisms and techniques which have been described are merely illustrative of one application of the principles of the invention. Numerous modifications may be made to the methods and apparatus described without departing from the true of the invention.

What is claimed is:

1. A stereographic image compressor comprising:
   a pair of image sensors for providing a first image signal and a second image signal, said first image signal indicative of a first field of view of an image, said second image signal indicative of a second field of view of said image;
   an image size and position unit, responsive to said first image signal and said second image signal, for resizing and repositioning said images represented by said first and said second image signals, in accordance with an image position signal and an image size signal, to generate a modified first image signal and a modified second image signal, said modified first image signal and said modified second image signal each characterized by a same size and position;
   a function processing unit, responsive to said modified first image signal and said modified second image signal, for generating, in accordance with at least a first weighting signal, a difference image signal, indicative of differences between said modified first image signal and said modified second image signal;
   a lossy compressor, responsive to said difference image signal, for compressing image information contained in said difference image signal, to generate a compressed image information signal; and
   an adaptive processing unit, responsive to a calibration mode, for adaptively generating said image position signal, said image size signal and said first weighting signal as a function of said difference image signal and said compressed image information signal.

2. A stereographic image compressor as set forth in claim 1 wherein said adaptive processing unit repeatedly responds, in said calibration mode, to said difference image signal and said compressed image information signal by modifying said image position signal, said image size signal and said first weighting signal.

3. A stereographic image compressor as set forth in claim 2 further comprising a second lossy compressor for compressing image information contained in said modified first image signal to generate a compressed first image signal and wherein said stereographic image compressor further comprises a storage device for storing said compressed image information signal and said compressed first image signal.

4. A stereographic image compressor as set forth in claim 2 further comprising a second lossy compressor for compressing image information contained in said modified second image signal to generate a compressed second image signal and wherein said stereographic image compressor further comprises a storage device for storing said compressed image information signal and said compressed second image signal.

5. A stereographic image compressor as set forth in claim 4 further comprising means responsive to said compressed image information signal and said compressed second image signal, for generating said first image signal and said second image signal as a function of said image position signal, said image size signal and said first weighting signal.

6. A stereographic image compressor as set forth in claim 4 further comprising means responsive to said compressed image information signal and said compressed second image signal, for generating said first image signal and said second image signal as a function of said image position signal, said image size signal and said first weighting signal.

7. A complete readable storage medium comprising apparatus for compressing stereographic images, comprising:
   synchronizing means, responsive to a pair of image signals, comprising a first image signal containing image information corresponding to a first of two locations and a second image signal containing image information corresponding to a second of said two locations, for time synchronizing said first image signal with said second image signal;
   image size and position means, responsive to said synchronizing means, for modifying, as a function of size and position values, said first image signal and said second image signal to generate a modified first image signal and a modified second image signal, said first and second modified image signals being characterized by a single size and position of said field of view;
   difference generation means, responsive to said image size and position means, for generating, as a function of at least a first weighting value, a difference signal, indicative of differences between said first and said second modified image signals;
   lossy compressor means, responsive to said difference generation means, for compressing said difference signal to generate a compressed difference signal; and
   calibration means, responsive to a calibration mode, for adaptively generating said size and position values and said first weighting value as a function of said difference signal.

8. A method for comprising stereographic image data, said method comprising:
   time synchronizing a first image signal with a second image signal, said first image signal containing image information corresponding to a first of two locations, said second image signal containing image information corresponding to a second of said two locations;
   modifying, as a function of size and position values, said first image signal and said second image signal to generate a modified first image signal and a modified second image signal, said modified first and second image signals being characterized by a single size and position of said field of view;
   generating, as a function of at least a first weighting value, a difference signal indicative of differences between said first and said second modified image signals;
   compressing said difference signal to generate a compressed difference signal; and
   adaptively generating, in response to a calibration mode, size and position values and said first weighing value as a function of said difference signal.

* * * * *